United States Patent
Isokawa et al.

(10) Patent No.: US 12,103,272 B2
(45) Date of Patent: Oct. 1, 2024

(54) RESIN COMPOSITION FOR LAMINATED GLASS INTERLAYER, LAMINATED GLASS INTERLAYER, AND LAMINATED GLASS

(71) Applicant: DOW-MITSUI POLYCHEMICALS CO., LTD., Tokyo (JP)

(72) Inventors: Motoaki Isokawa, Chiba (JP); Norihiko Sato, Chiba (JP); Kana Kukita, Chiba (JP); Shun Tobinaga, Chiba (JP)

(73) Assignee: DOW-MITSUI POLYCHECMICALS CO., LTD., Tokyo (JP)

( * ) Notice: Subject to any disclaimer, the term of this patent is extended or adjusted under 35 U.S.C. 154(b) by 134 days.

(21) Appl. No.: 17/438,313

(22) PCT Filed: Mar. 6, 2020

(86) PCT No.: PCT/JP2020/009651
§ 371 (c)(1),
(2) Date: Sep. 10, 2021

(87) PCT Pub. No.: WO2020/189335
PCT Pub. Date: Sep. 24, 2020

(65) Prior Publication Data
US 2022/0184928 A1 Jun. 16, 2022

(30) Foreign Application Priority Data
Mar. 20, 2019 (JP) ................. 2019-053411

(51) Int. Cl.
*B32B 17/10* (2006.01)
*C08L 23/08* (2006.01)

(52) U.S. Cl.
CPC ........ *B32B 17/10623* (2013.01); *B32B 17/10* (2013.01); *B32B 17/10036* (2013.01); *B32B 17/10743* (2013.01); *C08L 23/0876* (2013.01); *B32B 2264/104* (2013.01); *B32B 2307/412* (2013.01)

(58) Field of Classification Search
CPC .............. B32B 17/10623; B32B 17/10; B32B 17/10036; B32B 17/10743; B32B 2264/104; B32B 2307/412; C08L 23/0876
USPC ........................................... 428/430
See application file for complete search history.

(56) References Cited

U.S. PATENT DOCUMENTS

| | | | |
|---|---|---|---|
| 10,280,280 B2 | 5/2019 | Hansen et al. | |
| 11,673,381 B2 | 6/2023 | Smith | |
| 2005/0142366 A1* | 6/2005 | Fugiel | B29C 48/08 428/437 |
| 2013/0225746 A1* | 8/2013 | Hansen | B32B 17/10743 524/437 |
| 2016/0229985 A1 | 8/2016 | Hansen et al. | |
| 2019/0030863 A1* | 1/2019 | Smith | B32B 7/06 |

FOREIGN PATENT DOCUMENTS

| | | | | |
|---|---|---|---|---|
| JP | 2010-24061 A | 2/2010 | | |
| JP | 2015-513586 A | 5/2015 | | |
| WO | WO-2013126867 A1 * | 8/2013 | ....... | B32B 17/10623 |
| WO | WO-2015072538 A1 * | 5/2015 | ....... | B32B 17/10559 |
| WO | WO-2017204342 A1 * | 11/2017 | ....... | B32B 17/10 |
| WO | 2019027865 A1 | 2/2019 | | |

OTHER PUBLICATIONS

Extended European Search Report (EESR) dated Nov. 4, 2022 for European Patent Application No. 20774824.5.
International Search Report (ISR) dated May 19, 2020 filed in PCT/JP2020/009651.
Korean Office Action (KROA) dated May 12, 2023 issued in Korean patent application No. 10-2021-7033381 and its English machine translation.

* cited by examiner

*Primary Examiner* — Michael M. Bernshteyn
(74) *Attorney, Agent, or Firm* — RANKIN, HILL & CLARK LLP

(57) ABSTRACT

An aspect of the present invention is a resin composition for a laminated glass interlayer used for forming a laminated glass interlayer. The resin composition for a laminated glass interlayer includes an ionomer (A) of an ethylene-unsaturated carboxylic acid-based copolymer, and an inorganic filler (B). The volume-based cumulative 10% diameter ($D_{10}$) of the inorganic filler (B) as measured by a laser diffraction scattering method is equal to or more than 0.1 μm and equal to or less than 10 μm.

7 Claims, No Drawings

RESIN COMPOSITION FOR LAMINATED GLASS INTERLAYER, LAMINATED GLASS INTERLAYER, AND LAMINATED GLASS

TECHNICAL FIELD

The present invention relates to a resin composition for a laminated glass interlayer, a laminated glass interlayer, and a laminated glass.

BACKGROUND ART

In recent years, enhancement of the utility value of laminated glass has been promoted by improving its design. As a laminated glass with enhanced design, a laminated glass exhibiting a milky white color is known. An example of a technology related to such a laminated glass may be the technology described in Patent Document 1, in which alumina trihydrate, alumina, or the like is used as a pigment.

RELATED DOCUMENT

Patent Document

[Patent Document 1] PCT Japanese Translation Patent Publication No. 2015-513586

SUMMARY OF THE INVENTION

Technical Problem

The technical level required for laminated glass is progressively rising. The present inventors have found the following problems in relation to laminated glass.

It has been found that in a resin composition including a pigment having the particle size and type as described in Patent Document 1, it is difficult to achieve both an enhancement in the optical characteristics and an enhancement in the adhesiveness to glass.

The present invention was made in view of problems such as described above, and an object of the present invention is to provide a resin composition for a laminated glass interlayer having enhanced optical characteristics and adhesiveness to glass.

Solution to Problem

According to the present invention, there is provided a resin composition for a laminated glass interlayer, the resin composition being used for forming a laminated glass interlayer, the resin composition including: an ionomer (A) of an ethylene-unsaturated carboxylic acid-based copolymer; and an inorganic filler (B), in which a volume-based cumulative 10% diameter ($D_{10}$) of the inorganic filler (B) as measured by a laser diffraction scattering method is equal to or more than 0.1 μm and equal to or less than 10 μm.

Furthermore, according to the present invention, there is provided a laminated glass interlayer formed using the above-mentioned resin composition for a laminated glass interlayer.

Furthermore, according to the present invention, there is provided a laminated glass including the above-mentioned laminated glass interlayer and a transparent plate-shaped member provided on both sides of the laminated glass interlayer.

Advantageous Effects of Invention

According to the present invention, a technology related to a resin composition for a laminated glass interlayer having enhanced optical characteristics and adhesiveness to glass can be provided.

DESCRIPTION OF EMBODIMENTS

Hereinafter, embodiments of the present invention will be described in detail. In the present specification, the notation "a to b" in the description of a numerical value range indicates that the range is equal to or more than a and equal to or less than b, unless particularly stated otherwise. The term (meth)acryl means acryl or methacryl.

The resin composition for a laminated glass interlayer according to an embodiment is a resin composition for a laminated glass interlayer used for forming a laminated glass interlayer. The resin composition for a laminated glass interlayer includes an ionomer (A) of an ethylene-unsaturated carboxylic acid-based copolymer, and an inorganic filler (B). In the following description, each component of the resin composition for a laminated glass interlayer of the present embodiment will be described in detail.

(Ionomer (A) of Ethylene-Unsaturated Carboxylic Acid-Based Copolymer)

The ionomer (A) of an ethylene-unsaturated carboxylic acid-based copolymer according to the present embodiment is a resin obtained by neutralizing at least a portion of carboxyl groups of a polymer obtained by copolymerizing ethylene with at least one of unsaturated carboxylic acids, with metal ions. As the ethylene-unsaturated carboxylic acid-based copolymer, a copolymer containing ethylene and an unsaturated carboxylic acid can be mentioned as an example.

Examples of the unsaturated carboxylic acid in the ethylene-unsaturated carboxylic acid-based copolymer include acrylic acid, methacrylic acid, 2-ethylacrylic acid, crotonic acid, maleic acid, fumaric acid, itaconic acid, maleic anhydride, fumaric anhydride, itaconic anhydride, monomethyl maleate, and monoethyl maleate. Among these, the unsaturated carboxylic acid is preferably at least one selected from acrylic acid and methacrylic acid, from the viewpoints of productivity, hygiene, and the like of the ethylene-unsaturated carboxylic acid-based copolymer. These unsaturated carboxylic acids may be used singly, or two or more kinds thereof may be used in combination.

According to the present embodiment, a particularly preferable ethylene-unsaturated carboxylic acid-based copolymer is an ethylene-(meth)acrylic acid copolymer.

With regard to the ionomer (A) of the ethylene-unsaturated carboxylic acid-based copolymer according to the present embodiment, when a total amount of structural units constituting the ethylene-unsaturated carboxylic acid-based copolymer is designated as 100% by mass, a content of a structural unit derived from ethylene is preferably equal to or more than 65% by mass and equal to or less than 95% by mass, and more preferably equal to or more than 75% by mass and equal to or less than 92% by mass.

When the content of the structural unit derived from ethylene is equal to or more than the above-described lower limit value, the heat resistance, mechanical strength, water resistance, processability, and the like of a resulting laminated glass interlayer can be further improved. Furthermore, when the content of the structural unit derived from ethylene is equal to or less than the above-described upper limit value, the transparency, flexibility, adhesiveness to glass, and the like of a resulting laminated glass interlayer can be further improved.

With regard to the ionomer (A) of the ethylene-unsaturated carboxylic acid-based copolymer according to the present embodiment, when the total amount of the structural units constituting the ethylene-unsaturated carboxylic acid-based copolymer is designated as 100% by mass, a content of a structural unit derived from an unsaturated carboxylic acid is preferably equal to or more than 5% by mass and equal to or less than 35% by mass, and more preferably equal to or more than 8% by mass and equal to or less than 25% by mass.

When the content of the structural unit derived from an unsaturated carboxylic acid is equal to or more than the above-described lower limit value, the transparency, flexibility, adhesiveness to glass, and the like of a resulting laminated glass interlayer can be further improved. Furthermore, when the content of the structural unit derived from an unsaturated carboxylic acid is equal to or less than the above-described upper limit value, the heat resistance, mechanical strength, water resistance, processability, and the like of a resulting laminated glass interlayer can be further improved.

In the ethylene-unsaturated carboxylic acid-based copolymer, when the total amount of the structural units constituting the ethylene-unsaturated carboxylic acid-based copolymer is designated as 100% by mass, preferably equal to or more than 0% by mass and equal to or less than 30% by mass, and more preferably equal to or more than 0% by mass and equal to or less than 25% by mass, of structural units derived from other copolymerizable monomers may be included. Examples of the other copolymerizable monomers include unsaturated esters, for example, vinyl esters such as vinyl acetate and vinyl propionate; and (meth)acrylic acid esters such as methyl (meth)acrylate, ethyl (meth)acrylate, isobutyl (meth)acrylate, n-butyl (meth)acrylate, and 2-ethylhexyl (meth)acrylate. When structural units derived from other copolymerizable monomers are included in the above-described range, it is preferable from the viewpoint that the flexibility and transparency of a laminated glass interlayer obtained by using the resin composition for a laminated glass interlayer are enhanced.

Examples of a metal ion constituting the ionomer (A) of the ethylene-unsaturated carboxylic acid-based copolymer include monovalent metal ions such as lithium ion, potassium ion, silver ion, mercury ion, and copper ion; and polyvalent metal ions such as calcium ion, magnesium ion, zinc ion, aluminum ion, barium ion, beryllium ion, strontium ion, copper ion, cadmium ion, mercury ion, tin ion, lead ion, iron ion, cobalt ion, and nickel ion.

Among these, it is preferable that one kind or two or more kinds selected from lithium ion, potassium ion, calcium ion, magnesium ion, zinc ion, aluminum ion, and barium ion are included; it is more preferable that at least one selected from potassium ion, zinc ion, and magnesium ion is included; and it is particularly preferable that at least one selected from magnesium ion and zinc ion is included.

When the ionomer (A) of the ethylene-unsaturated carboxylic acid-based copolymer is formed of the above-mentioned metal ion, foaming or gelation is less likely to occur during film-forming of a laminated glass interlayer, and production stability can be increased, as compared to the case of using sodium ion as the metal ion.

The upper limit of a degree of neutralization of the ionomer (A) of the ethylene-unsaturated carboxylic acid-based copolymer according to the present embodiment is preferably equal to or less than 95%, more preferably equal to or less than 90%, even more preferably equal to or less than 80%, still more preferably equal to or less than 70%, and particularly preferably equal to or less than 60%, from the viewpoint of further improving the flexibility, adhesiveness to glass, mechanical strength, processability, and the like of a laminated glass interlayer obtainable by using the resin composition for a laminated glass interlayer.

Furthermore, the lower limit of the degree of neutralization of the ionomer (A) of the ethylene-unsaturated carboxylic acid-based copolymer according to the present embodiment is preferably equal to or more than 5%, more preferably equal to or more than 10%, even more preferably equal to or more than 15%, and particularly preferably equal to or more than 20%, from the viewpoint of further improving the transparency, heat resistance, water resistance, and the like of a laminated glass interlayer obtainable by using the resin composition for a laminated glass interlayer.

Here, the degree of neutralization of the ionomer (A) of the ethylene-unsaturated carboxylic acid-based copolymer refers to a proportion (%) of carboxyl groups neutralized by metal ions among all the carboxyl groups included in the ethylene-unsaturated carboxylic acid-based copolymer.

A method for producing the ethylene-unsaturated carboxylic acid-based copolymer according to the present embodiment is not particularly limited, and the copolymer can be produced by a known method. For example, the copolymer can be obtained by subjecting each polymerization component to radical copolymerization at a high temperature and a high pressure. The ionomer (A) of the ethylene-unsaturated carboxylic acid-based copolymer according to the present embodiment can be obtained by reacting the ethylene-unsaturated carboxylic acid-based copolymer with a metal compound. Furthermore, regarding the ionomer (A) of the ethylene-unsaturated carboxylic acid-based copolymer, a commercially available product may also be used.

Regarding the ionomer (A) of the ethylene-unsaturated carboxylic acid-based copolymer, the melt flow rate (JIS K7210-1999) at 190° C. under a load of 2160 g is preferably 0.1 to 150 g/10 minutes, and more preferably 0.1 to 50 g/10 minutes, in view of processability and mechanical strength.

The lower limit of a content percentage of the ionomer (A) of the ethylene-unsaturated carboxylic acid-based copolymer in the total amount of the resin composition for a laminated glass interlayer is preferably equal to or more than 75% by mass, more preferably equal to or more than 78% by mass, and even more preferably equal to or more than 80% by mass.

The upper limit of the content percentage of the ionomer (A) of the ethylene-unsaturated carboxylic acid-based copolymer in the total amount of the resin composition for a laminated glass interlayer is preferably equal to or less than 99% by mass, more preferably equal to or less than 98% by mass, even more preferably equal to or less than 95% by mass, particularly preferably equal to or less than 90% by mass, and most preferably equal to or less than 87% by mass.

By setting the content percentage of the ionomer (A) of the ethylene-unsaturated carboxylic acid-based copolymer to be equal to or more than the above-described lower limit value, the adhesiveness to glass, water resistance, and rigidity can be sufficiently enhanced.

By setting the content percentage of the ionomer (A) of the ethylene-unsaturated carboxylic acid-based copolymer to be equal to or less than the above-described upper limit value, sufficient optical properties, kneadability, and film-forming property of the resin composition for a laminated glass interlayer can be obtained.

(Inorganic Filler (B))

A metal constituting the inorganic filler (B) may be one or more selected from calcium, magnesium, zinc, barium, beryllium, strontium, copper, tin, and lead. Among these, calcium, magnesium, and barium are preferably used.

The metal may be included as an oxide, a carbonate, or a sulfate, and a carbonate or a sulfate is more preferable. From the viewpoint of the balance of optical characteristics, at least one selected from calcium carbonate, barium carbonate, barium sulfate, magnesium sulfate, magnesium oxide, and magnesium hydroxide is preferred, and calcium carbonate is particularly preferred.

The lower limit of a volume-based cumulative 10% diameter ($D_{10}$) of the inorganic filler (B) as measured by a laser diffraction scattering method is equal to or more than 0.1 μm, preferably equal to or more than 0.5 μm, and more preferably equal to or more than 1 μm. The upper limit of the volume-based cumulative 10% diameter ($D_{10}$) of the inorganic filler (B) is equal to or less than 10 μm, preferably equal to or less than 7 μm, and more preferably equal to or less than 5 μm.

By setting the $D_{10}$ of the inorganic filler (B) to be equal to or more than the above-described lower limit value, the haze of a laminated glass obtainable by using the resin composition for a laminated glass interlayer is increased, and the external appearance of the laminated glass can be made milky white.

Furthermore, by setting the $D_{10}$ of the inorganic filler (B) to be equal to or less than the above-described upper limit value, the total light transmittance of a laminated glass obtainable by using the resin composition for a laminated glass interlayer is increased, and the blinding property of the laminated glass can be adjusted to an appropriate range.

The inorganic filler (B) may have its surface coating-treated. The surface of the inorganic filler (B) may be coating-treated with at least one treatment agent selected from the group consisting of, for example, fatty acids, alicyclic carboxylic acids, aromatic carboxylic acids, resin acids, and derivatives such as metal salts, amine salts, and esters of these, silica, coupling agents, organosilicon compounds, silicone oils, paraffin, and condensed phosphoric acid. Thereby, the dispersibility of the inorganic filler (B) in the ionomer (A) of the ethylene-unsaturated carboxylic acid-based copolymer is enhanced during molding processing, an external appearance having a uniform milky white color tone is obtained, and the film-forming property of the resin composition for a laminated glass interlayer can be further enhanced.

The lower limit of a content percentage of the inorganic filler (B) with respect to the total amount of the resin composition for a laminated glass interlayer is preferably equal to or more than 1% by mass, more preferably equal to or more than 2% by mass, even more preferably equal to or more than 5% by mass, particularly preferably equal to or more than 10% by mass, and most preferably equal to or more than 13% by mass.

The upper limit of the content percentage of the inorganic filler (B) with respect to the total amount of the resin composition for a laminated glass interlayer is preferably equal to or less than 25% by mass, more preferably equal to or less than 22% by mass, and even more preferably equal to or less than 20% by mass.

By setting the content percentage of the inorganic filler (B) to be equal to or more than the above-described lower limit value, the haze of a laminated glass obtainable by using the resin composition for a laminated glass interlayer is increased, and the external appearance of the laminated glass can be made milky white.

By setting the content percentage of the inorganic filler (B) to be equal to or less than the above-described upper limit value, the total light transmittance of a laminated glass obtainable by using the resin composition for a laminated glass interlayer is increased, and the transparency of the laminated glass can be adjusted to an appropriate range.

It is preferable that the resin composition for a laminated glass interlayer according to the present embodiment further includes a silane coupling agent. By including a silane coupling agent, the film-forming property can be enhanced.

Examples of the silane coupling agent include silane coupling agents such as alkoxysilanes having an amino group, a glycidyl group or an epoxy group. More specific examples include γ-glycidoxypropyltrimethoxysilane, 3-glycidoxypropylmethyldimethoxysilane, 3-glycidoxypropylmethyldiethoxysilane, N-2(aminoethyl) 3-aminopropyltrimethoxysilane, N-2(aminoethyl) 3-aminopropylmethyldiethoxysilane, 3-aminopropyltrimethoxysilane, 3-aminopropyltriethoxysilane, N-phenyl-3-aminopropyltrimethoxysilane, and N-phenyl-3-Aminopropyltriethoxysilane. These silane coupling agents may be used singly, or two or more kinds thereof may be used in combination.

Among these, from the viewpoint of further improving the performance balance of the optical characteristics, water resistance, and adhesiveness to glass of a resulting laminated glass, and stabilizing the film-forming property during sheet processing, a silane coupling agent having an amino group, a glycidyl group, or an epoxy group is preferred, and a silane coupling agent having an amino group is more preferred.

In the resin composition for a laminated glass interlayer according to the present embodiment, when the total amount of the resin composition for a laminated glass interlayer is designated as 100% by mass, the content of the silane coupling agent is preferably equal to or more than 0.001% by mass and equal to or less than 5% by mass, more preferably equal to or more than 0.005% by mass and equal to or less than 2% by mass, and even more preferably equal to or more than 0.01% by mass and equal to or less than 1% by mass, from the viewpoint of further improving the performance balance of the optical characteristics, water resistance, and adhesiveness to glass of a resulting laminated glass.

In the resin composition for a laminated glass interlayer according to the present embodiment, various additives can be incorporated to the extent that the purpose of the present invention is not impaired. The various additives are not particularly limited; however, examples include a plasticizer, an oxidation inhibitor, an ultraviolet absorber, a wavelength converter, an antistatic agent, a surfactant, a colorant, a light stabilizer, a foaming agent, a lubricating agent, a crystal nucleating agent, a crystallization accelerator, a crystallization retardant, a catalyst deactivator, a heat ray absorber, a heat ray reflector, a heat dissipation agent, a thermoplastic resin other than the ionomer (A) of an ethylene-unsaturated carboxylic acid copolymer, a thermosetting resin, an inorganic filler, an organic filler, an impact resistance improver, a slip agent, a cross-linking agent, a cross-linking aid, a tackifier, a processing aid, a mold release agent, a hydrolysis inhibitor, a heat-resistant stabilizer, an anti-blocking agent, an anti-fogging agent, a flame retardant, a flame retardant aid, a light diffusing agent, an antibacterial agent, an antifungal agent, a dispersant, and other resins. The various additives may be used singly, or two or more kinds thereof may be used in combination.

With regard to the resin composition for a laminated glass interlayer of the present embodiment, from the viewpoint of making the external appearance of a laminated glass milky white and adjusting transparency to an appropriate range, it is preferable that a haze measured by the following method is equal to or more than 80%, and a total light transmittance is equal to or more than 50% and less than 80%; it is more preferable that the haze is equal to or more than 90%, and the total light transmittance is equal to or more than 50% and less than 80%; and it is even more preferable that the haze is equal to or more than 90%, and the total light transmittance is equal to or more than 60% and less than 70%.

(Method for Evaluating Haze and Total Light Transmittance)

A glass interlayer having a size of 120 mm×75 mm×0.35 to 0.45 mm in thickness, which is formed using the resin composition for a laminated glass interlayer according to the present embodiment, is obtained. Next, the obtained glass interlayer is interposed between two sheets of glass plates each having a size of 120 mm×75 mm×3.2 mm, the assembly is retained in a vacuum at 140° C. for 5 minutes in a vacuum laminator and then pressed at a pressure of 0.1 MPa (gauge pressure) for 3 minutes, and a laminated glass is obtained. Next, the haze and the total light transmittance of the obtained laminated glass are measured according to JIS K7136:2000 using a haze meter.

With regard to the resin composition for a laminated glass interlayer according to the present embodiment, the adhesive strength to a glass plate as measured by the following method is preferably equal to or more than 14 N/15 mm, and more preferably equal to or more than 20 N/15 mm. When the adhesive strength to a glass plate is equal to or more than the above-described lower limit value, the interlayer adhesiveness of a resulting laminated glass can be further improved.

In order to achieve such adhesive strength to a glass plate, the content, type, and the like of the ionomer (A) of the ethylene-unsaturated carboxylic acid-based copolymer or the silane coupling agent, which is used as necessary, in the resin composition for a laminated glass interlayer according to the present embodiment may be appropriately adjusted.

(Method for Evaluating Adhesive Strength)

A laminated glass interlayer having a size of 120 mm×75 mm×0.35 to 0.45 mm in thickness, which is formed using the resin composition for a laminated glass interlayer according to the present embodiment, is obtained. Next, the obtained laminated glass interlayer is laminated on a non-tin side of a glass plate having a size of 120 mm×75 mm×3.9 mm, the assembly is retained in a vacuum at 140° C. for 3 minutes in a vacuum laminator and then is pressed at a pressure of 0.1 MPa (gauge pressure) for 30 minutes, and the laminated glass interlayer is adhered to the non-tin side of the glass plate. Next, the laminated glass interlayer is pulled apart from the glass plate at an angle of 180° at a tensile rate of 100 ram/min, and the maximum stress is calculated as the adhesive strength (N/15 mm) to the glass plate.

According to the resin composition for a laminated glass interlayer described above, the external appearance of a laminated glass in which the resin composition for a laminated glass interlayer is used as a laminated glass interlayer, is made milky white, and it can be attempted to achieve both an enhancement in the optical characteristics of the laminated glass and an enhancement in the adhesiveness to a glass plate.

The laminated glass interlayer according to the present embodiment is formed using the resin composition for a laminated glass interlayer according to the present embodiment.

Forming of the laminated glass interlayer can be carried out by a known method of using a T-die extruder, a calender forming machine, an inflation forming machine, or the like. For example, the laminated glass interlayer can be obtained by dry blending in advance a master batch including an inorganic filler (B), an ionomer (A) of an ethylene-unsaturated carboxylic acid-based copolymer (A), and optionally additives such as an oxidation inhibitor, a light stabilizer, an ultraviolet absorber, and a silane coupling agent, supplying the blend to an extruder from the hopper, and subjecting the blend to extrusion forming into a sheet.

The master batch may include an ionomer (A) of an ethylene-unsaturated carboxylic acid-based copolymer and a dispersant, in addition to the inorganic filler (B). The ionomer (A) of an ethylene-unsaturated carboxylic acid-based copolymer used in the master batch may be identical to or different from the component of the ionomer (A) of an ethylene-unsaturated carboxylic acid-based copolymer that is added separately from the master batch. However, it is preferable that the total amount of the ionomer (A) of an ethylene-unsaturated carboxylic acid-based copolymer used in the master batch and the ionomer (A) of an ethylene-unsaturated carboxylic acid-based copolymer added separately from the master batch is adjusted in the range of the above-mentioned content percentage of the ionomer (A) of an ethylene-unsaturated carboxylic acid-based copolymer with respect to the total amount of the resin composition for a laminated glass interlayer.

Furthermore, the content percentage of the master batch with respect to the total amount of the resin composition for a laminated glass interlayer is not particularly limited; however, by adjusting the content percentage to be equal to or more than 10% by mass and equal to or less than 30% by mass, kneadability and extrudability of the resin composition for a laminated glass interlayer can be improved.

Examples of the dispersant include a polyether-based dispersant.

A thickness of the laminated glass interlayer is not particularly limited but is usually about 0.05 to 1.2 mm.

A laminated glass according to the present embodiment includes two sheets of a transparent plate-shaped member and the laminated glass interlayer according to the present embodiment disposed between the two sheets of the transparent plate-shaped member.

The laminated glass according to the present embodiment has excellent optical characteristics and excellent adhesiveness between the transparent plate-shaped members and the laminated glass interlayer, by including the laminated glass interlayer according to the present embodiment.

Examples of the configuration of the laminated glass include a configuration of a transparent plate-shaped member/a laminated glass interlayer/a transparent plate-shaped member. Two or more layers of the laminated glass interlayer may be used, or a layer formed from another resin may be interposed between two sheets of the laminated glass interlayer to form three or more layers.

The transparent plate-shaped member is not particularly limited; however, for example, a commonly used transparent plate glass can be used, and examples include inorganic glasses such as a float plate glass, a polished plate glass, a figured glass, a wired plate glass, a lined plate glass, a colored plate glass, a heat ray-absorbing plate glass, heat ray-reflecting plate glass, and a green glass. It is also possible to use organic plastic plates such as a polycarbonate plate, a poly (meth)acrylate plate, a polymethyl (meth) acrylate plate, a polystyrene plate, a cyclic polyolefin plate, a polyethylene terephthalate plate, a polyethylene naphthalate plate, and a polyethylene butyrate plate.

Furthermore, the transparent plate-shaped member may be appropriately subjected to a surface treatment such as a corona treatment, a plasma treatment, or a flame treatment.

A thickness of the transparent plate-shaped member is not particularly limited but is usually equal to or less than 20 mm, and preferably equal to or less than 10 mm. Although there is no limitation on the lower limit of the thickness of the transparent plate-shaped member, the thickness is usually equal to or more than 0.1 mm, and preferably equal to or more than 0.5 mm. In the laminated glass according to the present embodiment, with regard to each of the transparent plate-shaped members to be provided on both sides of the laminated glass interlayer, the same members may be used, or different plate-shaped members may be used in combination.

A method for producing the laminated glass according to the present embodiment is not particularly limited, and for example, conventionally known production methods such as a nip roll method, an autoclave method, a vacuum bag method, and a vacuum laminator method can be used. Production may be carried out using one kind of these techniques, and production can also be carried out by combining two or more kinds of production methods.

The method for producing a laminated glass according to the present embodiment can be carried out by, for example, inserting the laminated glass interlayer between two sheets of sheet-shaped glass and thermocompression bonding the assembly under heating and pressure. The heating temperature is preferably, for example, about 100° C. to 250° C., and the pressure is preferably, for example, about 10 kPa to 3 MPa (0.1 kg/cm$^2$ to 30 kg/cm$^2$).

These laminated glasses can be used for various use applications, and for example, they are used in laminated glass for construction, laminated glass for automobiles, general buildings, agricultural buildings, and railway windows; however, the use applications are not limited to these use applications.

Embodiments of the present invention have been described above; however, these are merely examples of the present invention, and various configurations other than the above-described ones can be adopted.

EXAMPLES

Hereinafter, the present invention will be described by way of Examples and Comparative Examples; however, the present invention is not intended to be limited to these.
(1) Materials
The details of the materials used for the production of laminated glass are as follows.
<Ionomer of ethylene-unsaturated crboxylic acid-based Copolymer>
Ionomer 1: Ionomer of ethylene-methacrylic acid copolymer (ethylene content 85% by mass, methacrylic acid content: 15% by mass, metal ion: zinc ion, degree of neutralization: 21%, MFR (conforming to JIS K7210: 1999, measured under the conditions of 190° C. and a load of 2160 g): 16 g/10 minutes)
Ionomer 2: Ionomer of ethylene-methacrylic acid copolymer (ethylene content 91% by mass, methacrylic acid content: 9% by mass, metal ion: zinc ion, degree of neutralization: 18%, MFR (conforming to JIS K7210: 1999, measured under the conditions of 190° C. and a load of 2160 g): 5.5 g/10 minutes)
Ionomer 3: Ionomer of ethylene-methacrylic acid copolymer (ethylene content 80% by mass, methacrylic acid content: 20% by mass, metal ion: magnesium ion, degree of neutralization: 40%, MFR (conforming to JIS K7210:1999, measured under the conditions of 190° C. and a load of 2160 g): 2.1 g/10 minutes)
Ionomer 4: Ionomer of ethylene-methacrylic acid copolymer (ethylene content 80% by mass, methacrylic acid content: 20% by mass, metal ion: zinc ion, degree of neutralization: 40%, MFR (conforming to JIS K7210: 1999, measured under the conditions of 190° C. and a load of 2160 g): 1.6 g/10 minutes)
<White Pigment Resin>
White pigment resin A: The ionomer 1 (50 parts by mass) was melt-kneaded together with 50 parts by mass of calcium carbonate that had been surface-treated with a polyether-based dispersant (volume-based cumulative 10% diameter ($D_{10}$) as measured by a laser diffraction scattering method 5.0 μm) at 160° C. with a twin-screw extruder, and a white pigment resin A was obtained.

White pigment resin B: The ionomer 1 (50 parts by mass) was melt-kneaded together with 50 parts by mass of barium sulfate that had been surface-treated with a polyether-based dispersant (volume-based cumulative 10% diameter ($D_{10}$) as measured by a laser diffraction scattering method 180 nm) at 160° C. with a twin-screw extruder, and a white pigment resin B was obtained.

White pigment resin C: The ionomer 1 (50 parts by mass) was melt-kneaded together with 50 parts by mass of titanium oxide that had been surface-treated with a polyether-based dispersant (volume-based cumulative 10% diameter ($D_{10}$) as measured by a laser diffraction scattering method 50 nm) at 160° C. with a twin-screw extruder, and a white pigment resin C was obtained.
<Silane Coupling Agent>
Si—C: Silane coupling agent having an amino group (N-(2-aminoethyl)-aminopropylmethyldimethoxysilane, KBM-602, manufactured by Shin-Etsu Chemical Co., Ltd.)

Examples 1 to 10 and Comparative Examples 1 and 2

An ionomer of an ethylene-unsaturated carboxylic acid-based copolymer, a white pigment resin, and a silane coupling agent were melt-kneaded at 160° C. at the blending proportions shown in Table 1, and a resin composition for a laminated glass interlayer was obtained. The resin composition for a laminated glass interlayer was subjected to extrusion sheet molding under the conditions of a die outlet resin temperature of 160° C. and a processing speed of 5 m/min to obtain a laminated glass interlayer having a thickness of 0.4 mm.

The resin compositions for laminated glass interlayers of Examples 1 to 10 and Comparative Examples 1 and 2 had no problem in the moldability of the laminated glass interlayer (sheet) (in Table 1, it is described that sheet moldability was o (satisfactory)).

In Table 1, the white pigment resins A, B, and C are master batches including the ionomer 1 and the inorganic filler (B) as described above, and for example, Example 1 includes 95 parts by mass of the ionomer 1, and Example 10 includes 80 parts by mass of the ionomer 3 and 10 parts by mass of the ionomer 1.

(2) Evaluation Methods
[Optical Characteristics—Haze and Total Light Transmittance]

Each of the laminated glass interlayers formed using the resin compositions for laminated glass interlayers obtained in Examples and Comparative Examples was cut out into a size of 120 mm×75 mm×0.4 mm in thickness. Next, the obtained laminated glass interlayer was interposed between two sheets of glass plates (manufactured by Asahi Glass Co., Ltd., product name: float plate glass) having a size of 120 mm×75 mm×3.2 mm, the assembly was retained in a vacuum at 140° C. for 5 minutes in a vacuum laminator and then was pressed at a pressure of 0.1 MPa (gauge pressure) for 3 minutes, and a laminated glass was obtained. The obtained laminated glass was cooled by slow cooling so as to return to room temperature over 30 minutes. Next, the haze and total light transmittance of the obtained laminated glass were measured using a haze meter (manufactured by Murakami Color Research Laboratory Co., Ltd., product name: haze meter HM150) according to JIS K7136:2000. The evaluation results for the haze were classified on the basis of the obtained haze values and the following evaluation criteria. Furthermore, the evaluation results for the total light transmittance were classified on the basis of the obtained total light transmittance values and the following evaluation criteria.

<Evaluation Criteria for Haze>
A (excellent): Haze is equal to or more than 90%
B (satisfactory): Haze is equal to or more than 80% and less than 90%
C (poor): Haze is less than 80%

<Evaluation Criteria for Total Light Transmittance>
A (excellent): Total light transmittance is equal to or more than 60% and less than 70%
B (satisfactory): Total light transmittance is equal to or more than 50% and less than 60%, or equal to or more than 70% and less than 80%.
C (poor): Total light transmittance is less than 50%, or equal to or more than 80%

[Adhesiveness to Glass]

Each of the laminated glass interlayers formed using the resin compositions for laminated glass interlayers obtained in Examples and Comparative Examples was cut out into a size of 120 mm×75 mm×0.4 mm. Next, the obtained laminated glass interlayer was laminated on a non-tin side of a glass plate having a size of 120 mm×75 mm×3.9 mm (manufactured by Asahi Glass Co., Ltd., product name: blue plate glass), the assembly was retained in a vacuum at 140° C. for 3 minutes in a vacuum laminator and then was pressed at a pressure of 0.1 MPa (gauge pressure) for 30 minutes, and the laminated glass interlayer was adhered to the non-tin side of the glass plate. An obtained sample was retained at 85° C. and a humidity of 90% for 500 hours, subsequently the sample was cooled to room temperature, subsequently the laminated glass interlayer was pulled apart from the glass plate at an angle of 180° at room temperature (25° C.) at a tensile rate of 100 ram/min, and the maximum stress was calculated as the adhesive strength (N/15 mm) to the glass plate. Next, the adhesiveness of the laminated glass interlayer to the glass plate was evaluated according to the following criteria.

<Evaluation Criteria for Adhesiveness to Glass>
A (excellent): Adhesive strength to glass plate (non-tin side) is equal to or more than 20 N/15 mm
B (satisfactory): Adhesive strength to glass plate (non-tin side) is equal to or more than 14 N/15 mm and less than 20 N/15 mm
C (poor): Adhesive strength to glass plate (non-tin side) is less than 14 N/15 mm

TABLE 1

| | | Example 1 | Example 2 | Example 3 | Example 4 | Example 5 | Example 6 | Example 7 | Example 8 | Example 9 | Example 10 | Comparative Example 1 | Comparative Example 2 |
|---|---|---|---|---|---|---|---|---|---|---|---|---|---|
| Ionomer of ethylene-unsaturated carboxylic acid-based copolymer | Ionomer 1 [parts by mass] | 90 | 85 | 80 | 90 | 85 | 80 | 30 | 5 | — | — | 95 | 90 |
| | Ionomer 2 [parts by mass] | — | — | — | — | — | — | 50 | 75 | — | — | — | — |
| | Ionomer 3 [parts by mass] | — | — | — | — | — | — | — | — | 60 | 80 | — | — |
| | Ionomer 4 [parts by mass] | — | — | — | — | — | — | — | — | 20 | — | — | — |
| White pigment resin A [parts by mass] | | 10 | 15 | 20 | — | — | — | 20 | 20 | 20 | 20 | — | — |
| White pigment resin B [parts by mass] | | — | — | — | 10 | 15 | 20 | — | — | — | — | — | — |
| White pigment resin C [parts by mass] | | — | — | — | — | — | — | — | — | — | — | 5 | 10 |
| Silane coupling agent | Si—C [parts by mass] | 0.2 | 0.2 | 0.2 | 0.2 | 0.2 | 0.2 | 0.2 | 0.2 | 0.2 | 0.2 | 0.2 | 0.2 |
| Evaluation | Sheet moldability | ○ | ○ | ○ | ○ | ○ | ○ | ○ | ○ | ○ | ○ | ○ | ○ |
| | Haze | A | A | A | A | A | A | A | A | A | A | C | A |
| | Total light transmittance | B | A | A | B | A | A | A | A | A | A | A | C |
| | Adhesiveness to glass | A | A | A | A | A | A | A | A | A | B | A | A |

Symbol "—" indicates that the value is zero.

As shown in Table 1, the resin compositions for laminated glass interlayers of Examples 1 to 10 exhibited excellent or satisfactory haze and total light transmittance, exhibited satisfactory sheet moldability (denoted as 0 in Table 1), and exhibited excellent or satisfactory adhesiveness to glass. In contrast, the resin compositions for laminated glass interlayers of Comparative Examples 1 and 2 exhibited poor haze and poor total light transmittance, respectively.

This patent application claims priority on the basis of Japanese Patent Application No. 2019-053411, filed on Mar. 20, 2019, the disclosure of which is incorporated herein in its entirety by reference.

The invention claimed is:

1. A resin composition for a laminated glass interlayer used for forming a laminated glass interlayer, the resin composition comprising:
   an ionomer (A) of an ethylene-unsaturated carboxylic acid-based copolymer; and
   an inorganic filler (B),
   wherein a volume-based cumulative 10% diameter ($D_{10}$) of the inorganic filler (B) as measured by a laser diffraction scattering method is equal to or more than 0.1 μm and equal to or less than 10 μm,
   the ionomer (A) of the ethylene-unsaturated carboxylic acid-based copolymer comprises one or more metal ions selected from the group consisting of magnesium ion and zinc ion, and
   the inorganic filler (B) comprises calcium carbonate.

2. The resin composition for a laminated glass interlayer according to claim 1,
   wherein a haze measured by the following method is equal to or more than 80%, and a total light transmittance measured by the following method is equal to or more than 50% and less than 80%:
   (method)
   a laminated glass interlayer formed using the resin composition for a laminated glass interlayer and having a size of 120 mm×75 mm×0.35 to 0.45 mm in thickness is obtained, next, the obtained laminated glass interlayer is interposed between two sheets of glass plates each having a size of 120 mm×75 mm×3.2 mm, the assembly is retained in a vacuum at 140° ° C. for 5 minutes in a vacuum laminator and then pressed at a pressure of 0.1 MPa (gauge pressure) for 3 minutes, and a laminated glass is obtained, and next, the haze and the total light transmittance of the obtained laminated glass are measured using a haze meter according to JIS K7136:2000.

3. The resin composition for a laminated glass interlayer according to claim 1,
   wherein the ionomer (A) of the ethylene-unsaturated carboxylic acid-based copolymer has a degree of neutralization of equal to or more than 5% and equal to or less than 95%.

4. The resin composition for a laminated glass interlayer according to claim 1, further comprising a silane coupling agent.

5. The resin composition for a laminated glass interlayer according to claim 4,
   wherein the silane coupling agent is an alkoxysilane having an amino group, a glycidyl group, or an epoxy group.

6. A laminated glass interlayer formed using the resin composition for a laminated glass interlayer according to claim 1.

7. A laminated glass comprising:
   the laminated glass interlayer according to claim 6; and
   transparent plate-shaped members provided on both sides of the laminated glass interlayer.

* * * * *

UNITED STATES PATENT AND TRADEMARK OFFICE
CERTIFICATE OF CORRECTION

| | | |
|---|---|---|
| PATENT NO. | : 12,103,272 B2 | Page 1 of 1 |
| APPLICATION NO. | : 17/438313 | |
| DATED | : October 1, 2024 | |
| INVENTOR(S) | : Motoaki Isokawa et al. | |

It is certified that error appears in the above-identified patent and that said Letters Patent is hereby corrected as shown below:

In the Claims

Column 14, Lines 7 to 8, (Claim 2), delete "the assembly is retained in a vacuum at 140° °C." and insert --the assembly is retained in a vacuum at 140° C.--

Signed and Sealed this
Thirtieth Day of September, 2025

John A. Squires
*Director of the United States Patent and Trademark Office*